United States Patent [19]

Nemoto

[11] Patent Number: 4,907,776
[45] Date of Patent: Mar. 13, 1990

[54] SEAT ADJUSTING DEVICE
[75] Inventor: Akira Nemoto, Akishima, Japan
[73] Assignee: Tachi-S Co., Ltd., Tokyo, Japan
[21] Appl. No.: 230,968
[22] Filed: Aug. 11, 1988
[51] Int. Cl.[4] .............................................. B60N 1/08
[52] U.S. Cl. ...................................................... 248/430
[58] Field of Search ............... 248/419, 420, 424, 429, 248/430; 297/330; 74/424 BR, 89.15

[56] References Cited

U.S. PATENT DOCUMENTS

| | | | |
|---|---|---|---|
| 2,919,744 | 1/1960 | Tanaka | 248/424 BR |
| 2,927,627 | 3/1960 | Lohr | 248/429 |
| 3,022,681 | 2/1962 | Cook | 74/424 BR |
| 3,184,209 | 5/1965 | Colautti | 248/429 |
| 3,410,515 | 11/1968 | Posh | 248/419 |
| 4,645,159 | 2/1987 | Terada . | |
| 4,721,337 | 1/1988 | Tomita . | |
| 4,742,983 | 5/1988 | Nihei | 248/419 |
| 4,802,374 | 2/1989 | Hamelin | 248/429 |
| 4,805,866 | 2/1989 | Aihara | 248/429 |

FOREIGN PATENT DOCUMENTS 57-47225 10/1982 Japan .
1236239 6/1986 U.S.S.R. ......................... 74/424 BR Primary Examiner—Ramon O. Ramirez
Assistant Examiner—Robert A. Olson
Attorney, Agent, or Firm—Browdy & Neimark

[57] ABSTRACT

A seat adjusting device for adjusting the seat position in the forward and backward directions by means of an externally provided motor. The device comprises an upper rail and a lower rail, both of them being slidably fitted together, a lead male screw rotatably supported within the space between the upper and lower rails, a female screw block which is also provided within that space and threadedly engaged with the lead male screw, and a drive mechanism disposed at the end of the upper lower rails in a manner exposed externally away from such space between those two rails. The seat adjusting device is, therefore, capable of small-sized formation and of being assembled with much ease without failure.

11 Claims, 3 Drawing Sheets

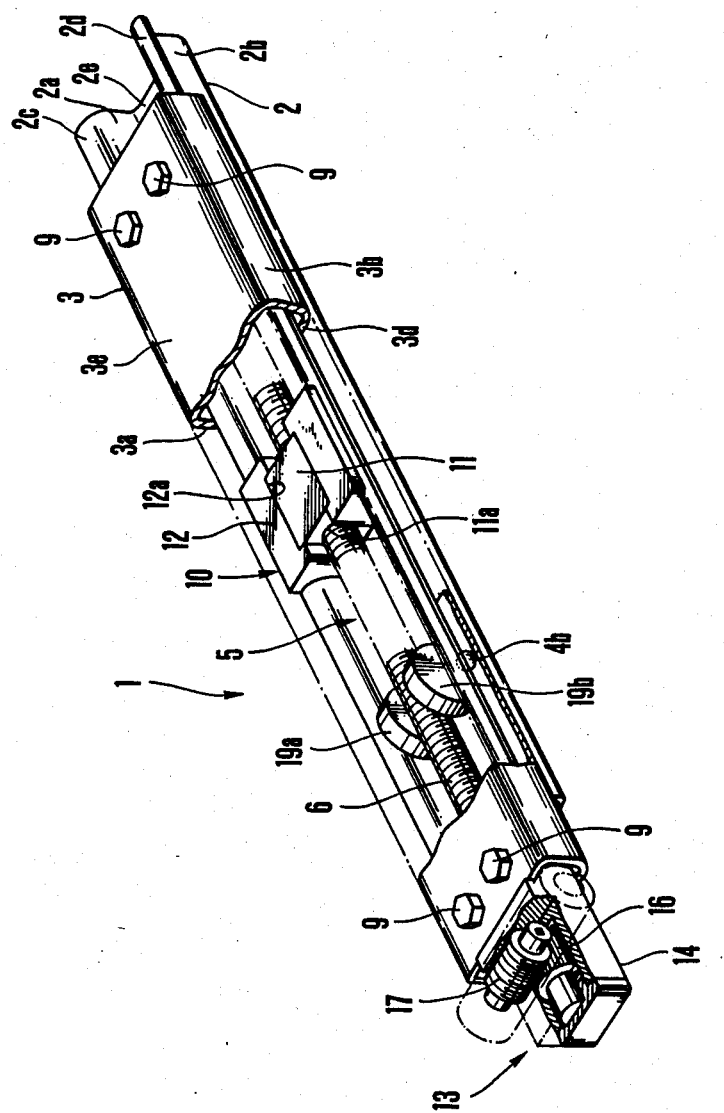

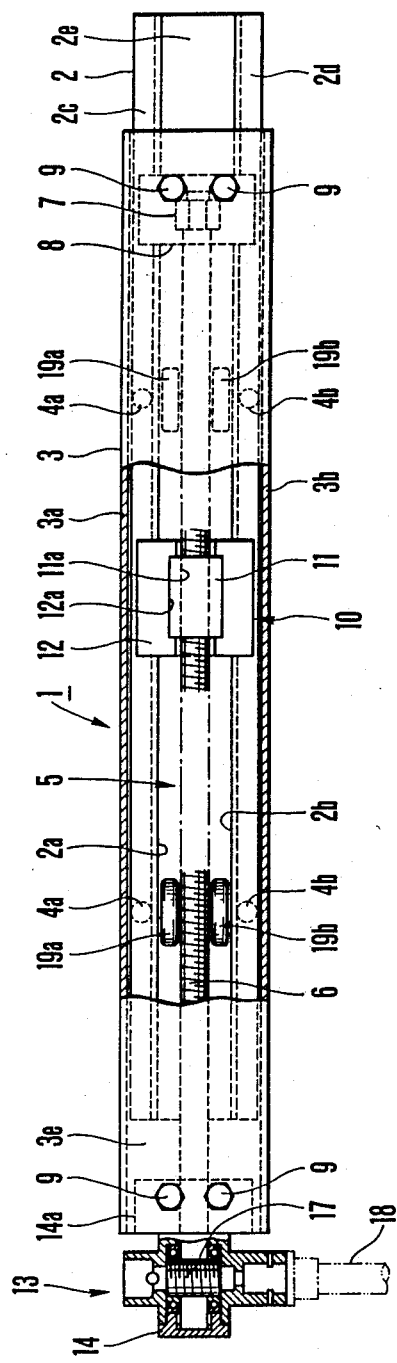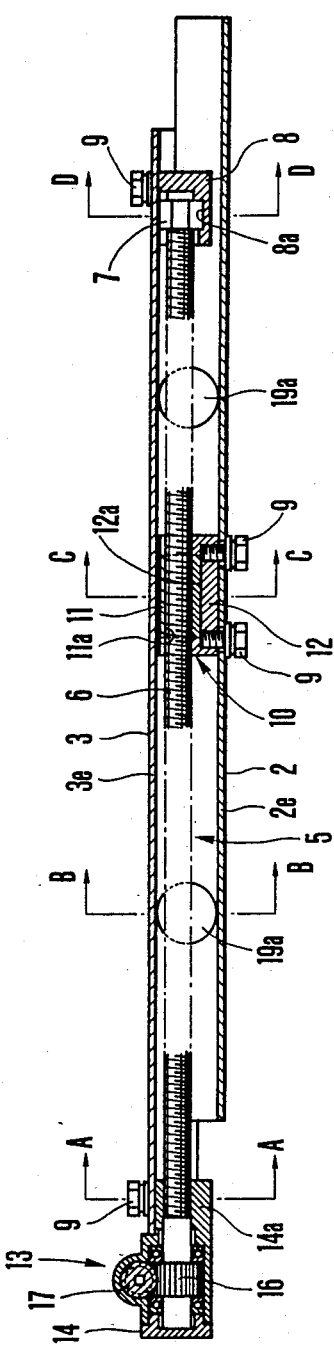

SEAT ADJUSTING DEVICE

BACKGROUND OF THE INVENTION

1. Field of the Invention

The present invention relates to a seat adjusting device adapted to adjust the position of the seat in its longitudinal direction, and particularly to a mechanically-driven seat adjusting device using a motor to effect such longitudinal seat adjustment, which is used for a power seat.

2. Description of the Prior Art

With the recent developments in an automobile or vehicle seat, increased attention has been paid to providing an electrically adjustable seat structure generally known as a power seat. Various types of the power seats have been proposed and put to a practical use. In particular, the power seat constructed for fore-and-aft adjustments of the seat position, is equipped with a seat adjusting device comprising a slide rail and a motor for causing the sliding motion of the seat in its longitudinal direction.

A conventional seat adjusting device of this kind used for the power seat is known from the Japanese Utility Model Publication No. 57-47225, for example. According to this prior art, the seat adjusting device per se is composed of a lower rail fixed to a floor of an automobile and an upper rail fixed to a seat, both of those two rails being slidably engaged together, and further a slide drive mechanism provided in the space defined between the upper and lower rails. The slide drive mechanism consists generally of a lead male screw rotatably journalled at the upper rail along the longitudinal direction of the latter, and a female screw block fixed on the lower rail, the female screw block being partially threadedly engaged with the lead male screw, and a gear box for transmitting a rotational driving force of a motor to the lead male screw. Hence, with the motor at work, the lead male screw is caused to rotate, thereby causing the sliding movement of the upper rail along the lower rail by virtue of the female screw block being fixed on the lower rail, so as to permit adjustment of the seat position in its longitudinal direction with respect to the floor of automobile.

However, in such prior art, the above-mentioned slide drive mechanism is bodily incorporated in the space defined between the upper and lower rails, which has created a negative aspect in the assembly of the seat adjusting device: annoying steps of fitting the component members, and consequent time-consuming, non-efficient procedures for completing the assembly. Moreover, such bodily incorporation of the slide drive mechanism within the upper and lower rails requires a wider space therebetween, resulting in an undesired great cross-sectional dimensions of the two rails, and thus increasing the whole dimensions of the seat adjusting device. Consequently, the prior art seat adjusting device has not been adaptable for use in a small automobile with low ceiling, having left unfavorable drawbacks.

SUMMARY OF THE INVENTION

With a view to obviating the above-stated drawbacks, the present invention has for its purpose the provision of an improved seat adjusting device with various improvements effective in solving the hitherto technical problems.

A first object of the invention is to provide an improved seat adjusting device which is very easy to assemble with great precision.

In accomplishing the object, in accordance with the present invention, a drive mechanism is disposed externally of a slide rail comprising upper and lower rails, and both lead male screw and female screw block, which are threadely engaged together, are disposed in the space defined between the upper and lower rails, wherein the drive mechanism is operatively connected with the lead male screw.

Accordingly, the provision of the drive mechanism externally of the slide rail permits an easy assembly of the seat adjusting device by simply mounting the lead male screw and female screw block within the slide rail. Further, as one advantageous aspect, the drive mechanism and female screw block are in a linearly connecting relation with each other via the lead male screw, whereupon those three elements constitutes one integral unit which can be attached as it is to the upper rail without any complicated procedures, and a subsequent procedure entails nothing but fixing the female screw block to the lower rail and fitting together the upper and lower rails. The assembling of the seat adjusting device is, therefore, effected with far greater ease and with assured precision.

A second object of the invention is to provide a small size of the seat adjusting device.

In achieving the object, the male lead screw and female screw block are provided in the space defined between the upper and lower rails. In view of small dimensions of those two screw elements, the space between the upper and lower rails does not need to be widely provided but can be provided in a smallest possible range inasmuch as the screw elements are installed therein.

This permits the slide rail to be formed in small dimensions, which realizes a small size of the seat adjusting device.

A third object of the invention is to provide a smooth and stable sliding motion of the upper rail relative to the lower rail.

In achieving the object, there are arranged rollers in the space between the upper and lower rails such that the rollers are disposed symmetrically relative to and on the opposite sides of the lead male screw, with almost no clearance between the rollers and lead male screw.

Such provision of the rollers establishes a well-balanced relation between the upper and lower rails and allows a smooth, stable sliding movement of the upper frame along the lower rail, and further serves to support the lead male screw on both sides, to thereby prevent a vibration of the lead male screw, during its rotation, which assures an accurate threaded engagement between the lead male screw and female screw block and thus the upper rail is moved smoothly without failure along the lower rail.

A fourth object of the invention is to avoid the lateral dislocation of the upper rail relative to the lower rail.

To this end, the upper rail is at its one end provided with a gear box and at its other end provided with a lead male screw support member, such that the base parts respectively of such gear box and support member are positioned within the lower rail with a slight clearance between those base parts and the inner surface of the lower rail.

Thus, the upper rail is prevented from being dislocated transversely with respect to the lower rail.

A fifth object of the invention is to provide a reinforced structure of the lower rail so as to prevent its deformation.

To this end, centrally of the lower rail, a holder is mounted for supporting the female screw block, such it is in a close contact with the inner surface of the lower rail.

The holder serves as a reinforcing element to add to the structural rigidity of the lower rails, so that the lower rail is protected against deformation in its both lateral walls as well as in its both end portions.

A sixth object of the present invention is to permit the seat adjusting device to be assembled without damage or failure in the engagement between the lead male screw and female screw block, even if there occurs a variation in the height-wise dimension of the upper rail relative to the upper part of the lower rail.

To attain the object, in accordance with the present invention, the female screw block comprises a female screw piece which is threadedly engaged with the lead male screw, and a support holder which accommodates the female screw piece therein. The female screw piece is slidably fitted in the support holder in a vertically movable manner.

Accordingly, if the upper frame varies in height-wise dimension relative to the upper part of the lower rail, the female screw piece is displaceable with such variation, so that the lead male screw is retained its linear line without being curved, thus keeping a stable engagement relation between the lead male screw and female screw block.

BRIEF DESCRIPTION OF THE DRAWINGS

FIG. 1 is a partially broken perspective view of a seat adjusting device in accordance with the present invention;

FIG. 2 is a partially broken plan view of the same seat adjusting device;

FIG. 3 is a longitudinally sectional view of the seat adjusting device;

DETAILED DESCRIPTION OF PREFERRED EMBODIMENT OF THE INVENTION

Figure 4:
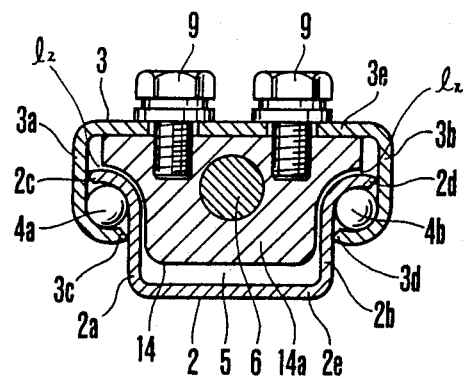
FIG. 4 is a cross-sectional view of the seat adjusting device taken along the line A—A in the FIG. 3.

With reference to FIGS. 1 through 7, there is illustrated one embodiment of the present invention.

As shown in FIG. 1, designation (1) represents a seat adjusting device on the whole in accordance with the present invention.

Reference numerals (2) and (3) denote a lower rail and an upper rail, respectively, both of them forming a part of the seat adjusting device (1). The lower rail (2) is fixed to the floor of an automobile (not shown) and the upper rail (3) is slidably fitted to the lower rail (2), upon which upper rail (3) a seat cushion (not shown) is mounted.

The lower rail (2) is formed in a substantially U-shaped cross-section, having a bottom wall (2e), a pair of lateral walls (2a)(2b) integral therewith, and a pair of flanges (2c)(2d) formed on the respective upper ends of the lateral walls (2a)(2b), such that the flanges (2c)(2d) extends outwardly of the lower rail (2) in a direction opposite to each other. On the other hand, the upper rail (3) is formed in a substantially inverted-U-shaped cross-section, having an upper wall (3e), a pair of lateral walls (3a)(3b) integral therewith, and a pair of inwardly curved flanges (3c)(3d) extending from the respective lower ends of the lateral walls (3a)(3b).

The manner in which those upper and lower rails (3)(2) are fitted together is such that the inwardly curved flanges (3c)(3d) of the upper rail (3) underlie the respective outwardly extended flanges (2c)(2d) of the lower rail (2), with a plurality of steel balls (46) being interposed, respectively, between one inwardly curved flange (3c) and one outwardly extended flange (2c), and between the other inwardly curved flange (3c) and other outwardly extended flange (2c), as shown.

A lead male screw (6) of a long rod shape extends horizontally within the space (5) defined between the upper and lower rails (3)(2) along the longitudinal direction thereof. The lead male screw (6) is at its forward end portion rotatably connected with a gear box (14) forming a drive mechanism and at its rearward end portion rotatably supported by a bearing member (7). Both gear box (14) and bearing member (7) will be described in detail below.

Figure 7:
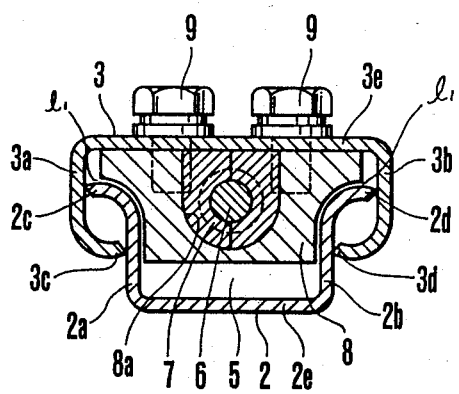
FIG. 7 is a cross-sectional view of the seat adjusting device taken along the line D—D in the FIG. 3.

As best shown in FIG. 3 and 7, the bearing member (7) is fitted in the recessed portion (8a) of a support base member (8) disposed at the rearmost area of the upper rail (3). The support base member (8) is, as clearly seen in FIG. 7, fixed on the inner surface of the upper wall (3d) of the upper rail (3) by means of bolts (9)(9), with a slight clearance ($\lambda$ 1) provided between both lateral sides of the support base member (8) and the corresponding inner surface areas of the lower rail (2). For that purpose, the support base (8) is formed to have a cross-section conforming to the inner surface of the lower rail (2) in a manner creating a slight clearance therebetween.

Within the space (5) between the upper and lower rails (3)(2), there is further provided a female screw block (10) substantially at the central point of the two rails (3)(2), the female screw block (10) comprising a female screw piece (11) having an internally threaded hole (11a) formed therein and a support holder (12) adapted to accommodate the female screw piece (11) therein. Specifically, the support holder (12) is in its upper half formed with a recessed portion (12a) which runs through the support holder (12) in the longitudinal direction thereof. In such recessed portion (12a), the female screw piece (11) is fitted in a vertically slidable manner.

Through the internally threaded hole (11a) of thus-constructed female screw piece (11), there extends the lead male screw (6) in a threaded engagement therewith.

Figure 6:
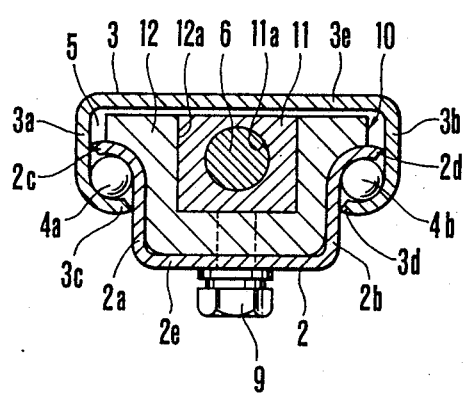
FIG. 6 is a cross-sectional view of the seat adjusting device taken along the line C—C in the FIG. 3.

As best seen in FIG. 6, the foregoing female screw block (10) is formed to have such a cross-section that substantially fills the cross-section of the space (5) defined between the upper and lower rails (3)(2). In other words, the female screw block (10) is at its lower portion formed in a manner conforming to the inner surface of the lower rail (2) and at its upper surface formed flat in parallel with the inner surface of the upper wall (3e) of the upper rail (3), with a slight clearance provided between the upper surface of the female screw block (10) and the inner surface of the upper wall (3e) of the upper rail (3). As illustrated, the thus-formed female screw block (10) is fixed at the bottom wall (2e) of the lower rail (2) by means of a bolt (9) such the lower surface of the screw block (10) is in a close contact with the inner surface of the lower rail (2).

The aforementioned lead male screw and female screw block, of course, form a part of the seat adjusting device (1).

As another part of the seat adjusting device (1), a drive mechanism (13) is arranged at the forward end of the upper rail (3) in a manner exposed externally of the upper and lower rails (3) (2), the drive mechanism (13) being adapted to rotate the lead male screw (6). In the present embodiment, as seen in FIG. 3, the drive mechanism (13) comprises a gear box (14) which consists essentially of a base portion (14a) fixed on the forward end of the upper rail (3), a worm (17), and a worm wheel (16). The forward end of the lead male screw (6) extends into an hole (not show in detail) of the gear box (14) and is rotatably supported thereby. The worm (17) and worm wheel (16) are meshed with each other and rotatably provided within the gear box (14), with such an arrangement wherein the worm wheel (16) is coaxially connected with the forward end of the lead male screw (6) whereas the worm (17) is oriented in a direction orthogonally intersecting the longitudinal direction of the lead male screw (6). Although not shown, the worm (17) is connected operatively via a rotation flexible wire (18) with a motor which is preferably located on the bottom of the seat cushion or the floor of automobile, so that a drive rotational force is transmitted through the wire (18), worm (17) and worm wheel (16) to the lead male screw (6) for its rotation.

As comparatively viewed from FIGS. 4 and 7, it should be noted that the cross-section of the base portion (14a) of the gear box (14) is generally the same with that of the above-mentioned support base member (8), such that the lower portion of the base portion (14a) is formed in a shape conforming to the inner surface of the lower rail (2), with a slight clearance (λ 2) provided between both lateral sides of the base portion (14a) and the corresponding inner surface areas of the lower rail (2).

With the above-described structure, the lead male screw (6) is at its forward end portion rotatably supported by the gear box (14) and at its rearward end portion rotatably supported by the bearing member (7), and also, at its central point threadedly engaged with the female screw block (10) fixed on the central portion of the lower rail (2).

It should be appreciated that the vertically slidability of the female screw piece (11) in the recessed portion (12a) of the support holder (12) associated with the female screw block (10) is effective in retaining the lead male screw (6) in a normal linear shape and horizontally relative to the upper rail (3), even in the case where a variation occurs in the height-wise dimension of the upper rail (3) relative to the outwardly extended flanges (2c)(2d) of the lower rail (2). Therefore, for example, if the upper frame (3) happens to be formed with a relatively high cross-section of the lateral walls (3a)(3b) and fitted to the lower rail (2), the height-wise dimension of the upper rail (2) becomes greater than normal in relation to the outwardly extended flanges (2c)(2d) of the lower rail (2), and the female screw piece (11) is thereby displaced at a higher level, due to the fact that the lead male screw (6) threadedly engaged with the female screw piece (11) is fixed at the upper rail (3) as stated previously, whereby the lead male screw (6) is maintained in its linearly extending state in parallel with the upper wall (3e) of the upper rail (3). Hence, the vertically slidability of the female screw piece (11) functions to compensate the irregularity in the height-wise dimension of the upper rail (3) relative to the lower rail (2) so as to keep retaining the original linear shape of the lead male screw (6) without deformation, and thus establish a stable threaded engagement relation between the lead male screw (6) and female screw block (10).

In a practical process of assembling the seat adjusting device (1), the above-mentioned lead male screw (6), female screw block (10) and drive mechanism (13) are previously connected together as an integral unit, before being provided between the upper and lower rails (3)(2). Thereafter, the unit of those elements is inserted into the space (5) between the upper and lower rails (3)(2) from the side of the forward end of both rails; in other words, the free end of the lead male screw (6) is first inserted into the space (5) from the forward end of the two rails (3)(2), then the female screw block (10) is inserted thereinto, and finally the drive mechanism (13) is secured at the forward end of the upper rail (3), after which, as stated above, by means of the bolts (9), the free end of the lead male screw (6) is rotatably fixed at the rear end portion of the upper rail (3), the female screw block (10) is fixed at the central point of the upper rail (3), and the drive mechanism (13) is fixed at the forward end of the upper rail (3), respectively.

Figure 5:
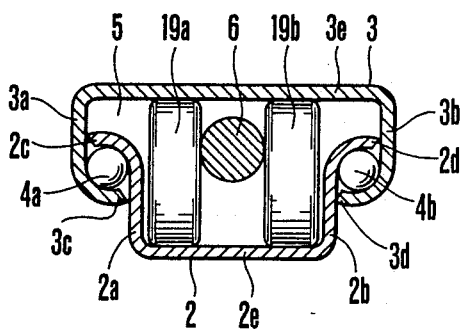
FIG. 5 is a cross-sectional view of the seat adjusting device taken along the line B—B in the FIG. 3.

Furthermore, within the space (5), two pairs of spaced rollers (19a)(19b) are arranged such that one pair of them is disposed forwardly in relation to the female screw block (10) and the other pair of them is disposed rearwardly in relation thereto. As illustrated, a pair of the rollers (19a)(19b) stand on the opposite sides of and symmetrically relative to the lead male screw (6), with each of the rollers (19a)(19b) being dimensioned such that its circumferential surface is in a rolling contact with the bottom wall (2e) of the lower rail (2) as well as with the upper wall (3e) of the upper rail (3), and that its thickness, as best seen in FIG. 5, is of such degree that its inner and outer lateral surfaces are generally in a slidable contact with the lead male screw (6) and either of the lateral walls (2a)(2b) of the lower rail (2), respectively.

The rollers (19a)(19b) may be increased in number, as required.

In operation, when the motor is energized, its rotational force is then transmitted via the flexible wire (18) to the drive mechanism (10), causing the rotation of the worm (17) which in turn causes the simultaneous rotation of the worm wheel (16). The rotation force is thereby transmitted to the lead male screw (6), whereupon a normal or reverse rotation of the lead male screw (6) is produced. Because the female screw block (10) is fixed on the lower rail (2), the lead male screw (6) in threaded engagement with the female screw block (10) is caused to move forwardly and backwardly in response to its own normal and reverse rotations, respectively, so that the upper rail (3) fixed to the lead male screw (6) is slidingly moved along the lower rail (2) in the longitudinal direction thereof. Accordingly, by control of the motor, the position of the seat may be adjusted to a desired point in the forward and backward directions.

From the above descriptions, it is understood that the present invention is endowed with the following various advantages.

(1) Since the drive mechanism (13) is provided externally of the upper and lower rails (3)(2), the seat adjusting device (1) is easily assembled by simply mounting the lead male screw (6) and female screw block (10) in the space (5) between the upper and lower rails (3)(2).

(2) The drive mechanism (13), lead male screw (6) and female screw block (10) are put together as one integral unit. This permits such unit to be inserted into the space (5) between the upper and lower rails (3)(2) which is already fit together and subsequent procedures involve nothing but the step of fixing those three elements (13)(6)(10) to the upper and lower rails (3)(2). The assembling of the seat adjusting device is, therefore, effected with far greater ease and with an assured precision.

(3) The lead male screw (6) and female screw block (10) are of small dimensions, and thus, the space (5) between the upper and lower rails (3)(2) does not need to be widely provided but can be provided in a smallest possible range inasmuch as those two screw elements are installed therein. Thus, the upper and lower rails (3)(2) can be formed in a small dimensions and it is practically possible to provide a small size of the seat adjusting device.

(4) The provision of the rollers (19a)(19b) on the opposite sides of an symmetrically relative to the lead male screw (6) enables the upper rail (3) to slide stably in parallel with the lower rail (2), and further serves to support the lead male screw (6) on both sides, which prevents a vibration of the screw (6) during its rotation, thus assuring an accurate threaded engagement between the screw (6) and the female screw piece (11). With this structure, the upper rail (3) is moved smoothly without failure and trouble along the lower rail (2).

(5) By virtue of the vertical slidability of the female screw piece (11), there is no concern about the engagement conditions between the upper and lower rails (3)(2), especially the dimensional variations of the upper rail (3) against the lower rail (2), which may cause deformation of the lead male screw (6). Thus, the assembling procedures of the seat adjusting device (1) are executed with no special attention to the dimensional precision of the upper and lower rails (3)(2), which contributes to the speed-up of the assembly of the seat adjusting device (1).

(6) The base part (14a) of the gear box (14) and the support base member (8), which are both disposed within the space (5) between the upper and lower rails (3)(2) with a slight clearance, prevent the upper rail (3) from being dislocated transversely of the lower rail (2).

(7) The support holder (12) associated with the female screw block (10) substantially fills the space (5) at the central point of the upper and lower rails (3)(2), and as such, serves as a reinforcing element for protecting the lower rail (2) against deformation in its both lateral walls (2a)(2b) and outwardly flanges (2c)(2d), thereby ensuring a sufficient structural rigidity of the rails (3)(2).

(8) Since the gear box (14) is disposed at the extremity of the upper rail (3), it is easily concealed from view by mounting a seat cushion on the upper rail (3), and it does not interfere with the lowering of the bottom of the seat cushion when an occupant is seated therein, giving no unpleasing cushiony state to the occupant.

While having described the present invention before, it should be understood that the invention is not limited to the illustrated embodiment, but other various replacements, modifications and additions may structurally be possible without departing from the scope and spirit of the appended claims for the invention. For instance, the lead male screw (6) may be rotatably secured at the lower rail (2) and the male screw block (10) may be fixed at the upper rail (3), as opposed to the above-described embodiment. Also, regarding the motor, it may be directly connected with the drive mechanism (13) instead of using the flexible wire (18), and further may be mounted on the upper rail (3).

What is claimed is:

1. A seat adjusting device, comprising:
   a lower rail fixed to a floor;
   an upper rail slidably fitted to said lower rail such that said upper rail is slidingly movable along a longitudinal direction of said lower rail, said upper rail being fixed with a seat;
   a lead male screw disposed in a space defined between said lower and upper rails, extending therein in a longitudinal direction of said two rails, said lead male screw being rotatably supported at one of said lower and upper rails;
   a female screw block fixedly provided at the other of said lower and upper rails;
   said lead male screw being partially in a threaded engagement with said female screw block;
   a drive mechanism for causing rotation of said lead male screw, said drive mechanism being connected with said lead male screw with such an arrangement that it is disposed externally of said space between said lower and upper rails and fixed at said one of said lower and upper rails where said lead male screw is rotatably supported; and
   at least a pair of rollers within said space between said lower and upper rails, such that they are disposed symmetrically in relation to an axial direction of said lead male screw for supporting said lead male screw from both sides.

2. The seat adjusting device according to claim 1, wherein said female screw block is so formed as to have a cross-section which substantially fills a cross-section of said space between said lower and upper rails.

3. The seat adjusting device according to claim 1, wherein said lead male screw, said female screw block and said drive mechanism are connected together so as to provide an integral unit that may be fixed to said lower and upper rails.

4. The seat adjusting device according to claim 1, wherein said drive mechanism is fixed at a forward end of said upper rail, wherein said drive mechanism comprises a gear box, wherein one end of said lead male screw extends into said gear box and is rotatably supported thereby, wherein said gear box includes a worm and a worm wheel rotatably provided therein, said worm being meshed with said worm wheel in a direction orthogonally intersecting a longitudinal direction of said lead male screw, said worm wheel being connected with said one end of said lead male screw, wherein said worm is operatively connected with a motor, and wherein said gear box further includes a base portion which conforms substantially to an inner surface of said lower rail with a slight clearance between said base portion and said inner surface of said lower rail.

5. The seat adjusting device according to claim 1, wherein said lead male screw is at its forward end rotatably supported by said drive mechanism and at its rearward end rotatably supported by a bearing member fixed at said upper rail, and wherein said bearing member so formed as to conform substantially to an inner surface of said lower rail with a slight clearance between said bearing member and said inner surface of said lower rail.

6. The seat adjusting device according to claim 1, wherein said at least one pair of rollers comprises two pairs of rollers, a first pair disposed forwardly with respect to said female screw block and a second pair disposed rearwardly with respect to said female screw block for supporting said lead male screw from both sides to prevent vibration of said lead male screw during rotation.

7. The seat adjusting device according to claim 1, wherein said drive mechanism is fixed at a forward end of said upper rail, wherein said drive mechanism comprises a gear box, wherein one end of said lead male screw extends into said gear box and is rotatably supported thereby, wherein said gear box includes a worm and a worm wheel rotatably provided therein, said worm being meshed with said worm wheel in a direction orthogonally intersecting a longitudinal direction of said lead male screw, said worm wheel being connected with said one end of said lead male screw, and wherein said worm is operatively connected with a motor.

8. The seat adjusting device according to claim 7, wherein said gear box is fixed at an end of said upper rail in a manner exposed externally thereof.

9. The seat adjusting device according to claim 1, wherein said female screw block includes a female screw piece having an internally threaded hole with which said lead male screw is partially threadedly engaged, and a support holder which accommodates said female screw piece therein.

10. The seat adjusting device according to claim 9, wherein said female screw piece is slidably fitted in said support holder in a vertically movable manner.

11. The seat adjusting device according to claim 9, wherein said female screw block is fixed at a central position of said lower rail in such a manner that the lower part of said female screw block is in a close contact with an inner surface of said lower rail.

* * * * *